US006963864B1

(12) United States Patent
Voevodsky

(10) Patent No.: US 6,963,864 B1
(45) Date of Patent: Nov. 8, 2005

(54) HUMAN RESOURCES INFORMATION INTERNET ACCESSIBLE DATABASE

(76) Inventor: Therese A. Voevodsky, 7430 Miller Estates Dr., SE., Caledonia, MI (US) 49316

( * ) Notice: Subject to any disclaimer, the term of this patent is extended or adjusted under 35 U.S.C. 154(b) by 370 days.

(21) Appl. No.: 09/602,921

(22) Filed: Jun. 23, 2000

Related U.S. Application Data

(60) Provisional application No. 60/166,189, filed on Nov. 18, 1999.

(51) Int. Cl.[7] ............................................ G06F 17/30

(52) U.S. Cl. ...................... 707/3; 707/2; 707/4; 707/6; 707/7; 707/10; 705/9; 705/10; 705/30; 705/36

(58) Field of Search ............................ 707/3, 10, 2, 6, 707/7, 4; 705/10, 30, 36, 9; 709/223

(56) References Cited

U.S. PATENT DOCUMENTS

| | | | | |
|---|---|---|---|---|
| 5,737,592 | A * | 4/1998 | Nguyen et al. | 707/4 |
| 5,970,467 | A * | 10/1999 | Alavi | 705/10 |
| 6,078,866 | A * | 6/2000 | Buck et al. | 702/2 |
| 6,085,174 | A * | 7/2000 | Edelman | 705/36 |
| 6,189,003 | B1 * | 2/2001 | Leal | 707/2 |
| 6,226,675 | B1 * | 5/2001 | Meltzer et al. | 709/223 |
| 6,401,079 | B1 * | 6/2002 | Kahn et al. | 705/30 |
| 6,411,938 | B1 * | 6/2002 | Gates et al. | 705/30 |
| 2001/0042000 | A1 * | 11/2001 | Defoor, Jr. | 705/9 |

FOREIGN PATENT DOCUMENTS

WO WO 99/17242 * 4/1999

OTHER PUBLICATIONS

Greg Goth and Christine blank, "Scarcity of IT workers is the mother of Recruiter Innovations", IEEE, 1999, pp. 15-17.*

Joann S. Lublin, "Web Transforms Art of Negotiating Raises," The Wall Street Journal, Sep. 22, 1998, printed p. 10/1.

Joyce A. Cain et al., "The Future of Salary Surveys," ACA News, Oct. 1997 (pp. 32-36).

* cited by examiner

*Primary Examiner*—Thuy N. Pardo
(74) *Attorney, Agent, or Firm*—Price, Heneveld, Cooper, DeWitt & Litton, LLP

(57) ABSTRACT

A database of subscriber data includes employee data for a plurality of employees and is correlated to a plurality of employee attributes. A query from a specific subscriber includes at least one desired employee attribute. A report is compiled from the database in response to the query that provides associated employee data for employees that have the at least one employee attribute. In a preferred embodiment, the report is electronically provided to the specific subscriber via an HTML form. In another embodiment, each query is associated with a specific subscriber and stored. When the specific subscriber later selects the stored query, an updated report is provided such that the specific subscriber is not required to again enter the at least one desired employee attribute associated with the stored query.

21 Claims, 4 Drawing Sheets

HUMAN RESOURCES INFORMATION INTERNET ACCESSIBLE DATABASE

This application claims priority based on U.S. Provisional Patent Application Ser. No. 60/166,189 entitled, "HUMAN RESOURCES INFORMATION INTERNET ACCESSIBLE DATABASE", by Therese A. Voevodsky, filed Nov. 18, 1999, the disclosure of which is hereby incorporated by reference.

BACKGROUND OF THE INVENTION

The present invention is directed to a technique for providing employee data, and more specifically to a technique that facilitates automated comparison of employee data between a plurality of subscribers.

Historically, progressive companies have attempted to stay abreast of employee data, such as employee compensation data (e.g., salaries, bonuses, benefits, perks, etc.) so as to retain key personnel and to fill open employment slots with highly qualified individuals. Traditionally, progressive companies have accomplished this goal through subscriptions to a human resources survey service that provides employee data, such as employee compensation data. Companies utilizing such services have generally been required to complete annual forms, with respect to their employees, and submit the forms to the service. The service, in turn, typically after a lengthy delay (e.g., twelve to eighteen months), has provided a paper compilation normally in the form of a lengthy book of job market statistics.

As a general rule, employee compensation data from a subscribing company has also been included within the compilation received from the service. As a result, when a particular company over-compensated or under-compensated their employees (in a given classification), the compilation was typically skewed. This has frequently required that each individual company summarize the information provided by the service with respect to their employee compensation data. As alluded to above, another disadvantage of such a service is that the information is typically dated, usually twelve to eighteen months old, at the time it is received from the service. This has required that each individual company age the data, which can result in disagreements between executives and line managers as to the proper aging factors.

Many services that provide surveys also require an individual company to purchase separate cuts of data. This can cost a company a substantial amount of money when the company desires employee data correlated to multiple scope measures (e.g., industry, profit/non-profit, company size, revenue and geographic location). Further, a typical prior art survey service has required participants to match their job requirements to benchmark descriptions. As a result, companies that have attempted to fill a position that required unique skills or a combination of unique skills have frequently had great difficulty in matching those unique skills to a particular benchmark description.

In addition, most prior art services have used codes for each particular benchmark description. When these codes have changed, which has occurred frequently, an individual within a particular company must audit the provided survey to ensure that the codes the company utilized still match the survey codes utilized. In volatile job markets, such survey reports do not provide a subscribing company with accurate up-to-date data on which to base employment related decisions. In an attempt to provide more up-to-date data, various web sites have provided Internet accessible job information. However, the majority of these web sites have not implemented proper measures to ensure the accuracy of the job information provided. Further, these web sites have not provided employee data (e.g., employee compensation data) that is correlated to a plurality of employee attributes.

As such, there exists a need for a technique that facilities automated comparison of employee data between a plurality of subscribers. Further, there exists a need for employee data that is correlated to a plurality of employee attributes.

SUMMARY OF THE INVENTION

The present invention is directed to a method and system that facilitates automated comparison of employee data between a plurality of subscribers. The automated comparison is made possible by maintaining a database of subscriber data obtained from the plurality of subscribers. The subscriber data includes employee data for a plurality of employees that is correlated to a plurality of employee attributes. To obtain a report, a specific subscriber provides a query that includes at least one desired employee attribute. A report is then compiled from the database in response to the query. The report provides associated employee data for employees that have the at least one desired employee attribute. In a preferred embodiment, the report is electronically provided to the specific subscriber via a hyper-text mark-up language (HTML) form.

In another embodiment, each query is associated with a specific subscriber and stored. When the specific subscriber later selects the stored query, an updated report is provided such that the specific subscriber is not required to again enter the at least one desired employee attribute associated with the stored query. In another embodiment, the report provides a comparison between employee compensation data of the specific subscriber and the employee compensation data of all other subscribers with the at least one desired employee attribute.

These and other features, advantages and objects of the present invention will be further understood and appreciated by those skilled in the art by reference to the following specification, claims, and appended drawings.

DETAILED DESCRIPTION OF PREFERRED EMBODIMENTS

Figure 1:
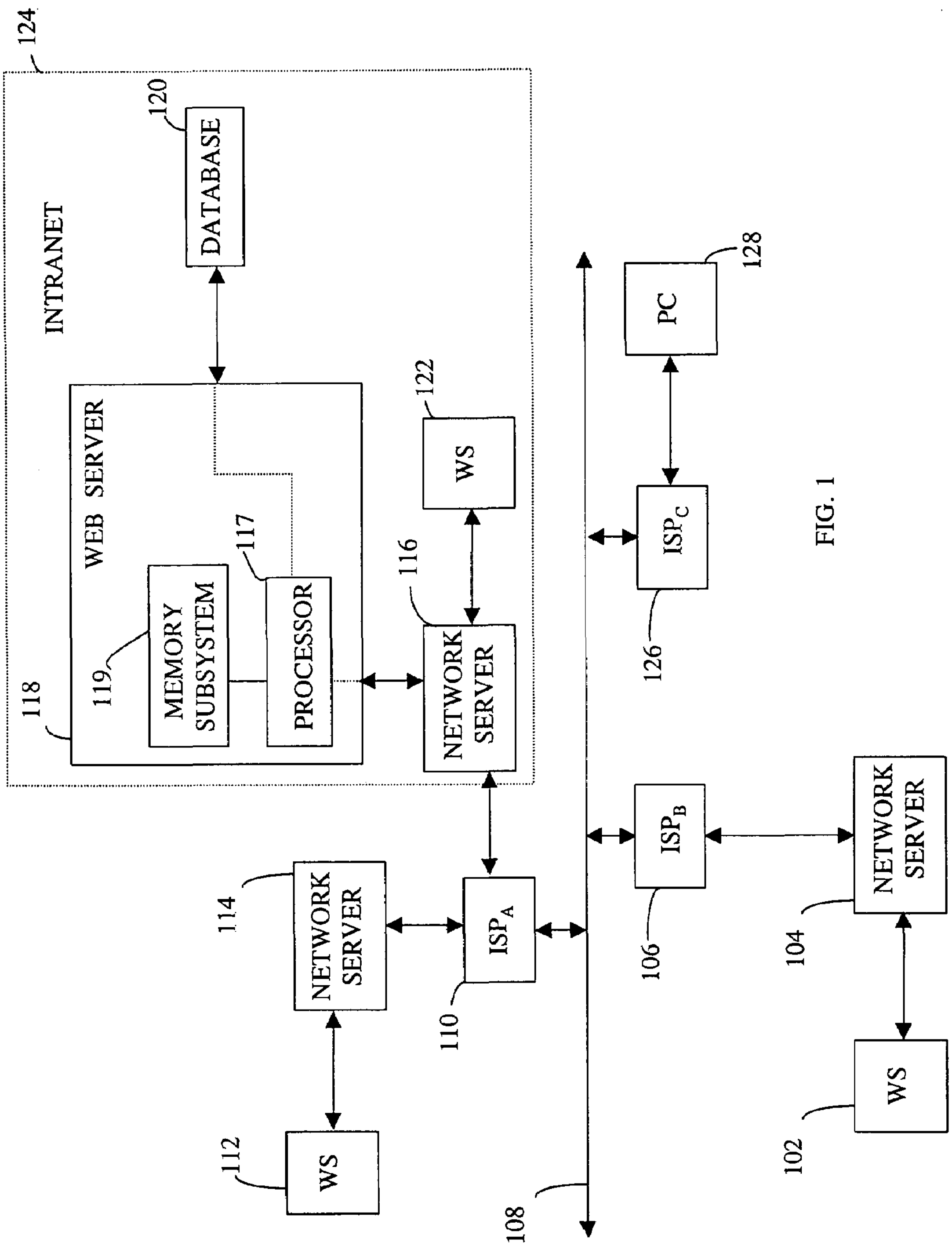
FIG. 1 is a block diagram of a computer network, according to an embodiment of the present invention.

The present invention is preferably implemented in a computer system that facilitates automated comparison of employee data, e.g., employee compensation data, between a plurality of subscribers. The computer system includes a processor 117 (FIG. 1) coupled to a memory subsystem 119. A processor executable code, stored within memory subsystem 119, causes the processor 117 to perform a number of steps. Subscriber data from the plurality of subscribers is compiled in a processor accessible database 120 comprising a hard disk drive (e.g., a CD-ROM) or other memory coupled to processor 117. The subscriber data includes employee compensation data (e.g., salaries, bonuses, benefits, perks, etc.) or other data for a plurality of employees. Preferably, each subscriber provides subscriber data on a quarterly basis. To compile a report, a specific subscriber must provide a query that includes at least one desired employee attribute (i.e., skills and responsibilities), among others.

In a preferred embodiment, each subscriber has their own private account, which contains all previously created queries (unless the previous query was deleted). In response to the query, the system compiles a report from the database that includes associated employee data, e.g., employee compensation data for employees that have the at least one desired employee attribute. In a preferred embodiment, the system allows an individual subscriber unlimited access and unlimited factor comparison. The number of subscribers is scalable in that additional computer resources can be added, if required. The present invention can provide reports based upon virtually any criteria included within the employee data. In a preferred embodiment, the system automatically extracts the employee data provided by a specific subscriber and summarizes it for comparison to all other subscribers. As such, the results are not contaminated with employee data from the specific subscriber and thus, there is no need for the specific subscriber to summarize the received information against the information the subscriber provided to the service.

In a preferred embodiment, each saved query can be updated on demand. This is advantageous in that human resource personnel need not reconstruct a stored query. As previously mentioned, many survey services require a subscriber to purchase separate cuts of data. Utilizing the system described herein, a subscriber can prepare any number of queries based upon any number of scope measures (e.g., profit/non-profit, industry, company size, revenue and geographic location) with little additional effort and no additional cost.

A system according to the present invention uses a search engine approach that allows subscribers to run keyword searches for desired information. As previously stated, this allows an individual subscriber to find a current market price for an individual with a combination of skills. Thus, a subscriber is not required to match their job needs to benchmark descriptions created by a survey service. Companies that use skill-based or competency-based levels (or virtually any other form of non-traditional pay systems) can put their subscriber data in a format that is usable by the system of the present invention with little additional effort. An example of one such record format is illustrated below in Table 1. One of ordinary skill in the art will appreciate that other record formats can be utilized. The record format illustrated in Table 1 is exemplary and is not intended to be limiting.

TABLE 1

| DATA | TYPE | LENGTH | DESCRIPTION |
|---|---|---|---|
| Job Title | char | 20 | |
| Job code | int | 4 | Not used |
| Exempt | char | 1 | "Y" or "N" |
| EEO class | int | 1 | 1–9 |
| Pay plan | char | 4 | Not used |

TABLE 1-continued

| DATA | TYPE | LENGTH | DESCRIPTION |
|---|---|---|---|
| Grade | int | 5 | |
| Min | int | 6 | $ |
| Middle | int | 6 | $ |
| Max | int | 6 | $ |
| Id (Employee No.) | int | 9 | |
| Name | char | 15 | |
| Gender | char | 1 | "M", "F", "U" |
| Race | char | 1 | "W", "B", "H", "A", "I", "U" |
| Zip Code | int | 5 | |
| Salary | int | 6 | $ |
| STI | int | 6 | $ |
| LTI | int | 6 | $ |
| Experience | int | 2 | Years |
| Education Level | char | 1 | 1-<HS, 2-HS, 3-Assoc., 4-BA/s, 5-MA/s, 6-PHD |
| Skills and Responsibilities (Comma Delimited) | char | 256 | |
| ID (Client No.) | int | 9 | |

An advantage of person-based information is that human resource personnel are not required to perform tedious audits to ensure that the codes they utilize match the codes the survey service is utilizing. Since information is preferably uploaded on a quarterly basis from each individual subscriber, information is typically more current than traditional print data survey services. Preferably, at most, subscriber data is no more than three months old. This allows progressive companies to respond to compensation increases in the job marketplace, thus retaining key personnel and enabling the company to fill key positions.

FIG. 1 depicts an exemplary subscriber server configuration, according to an embodiment of the present invention. In this embodiment, a subscriber workstation (WS) 102 is coupled to a network server 104 (e.g., through a network interface card (NIC) and an Ethernet). Network server 104 is coupled to an Internet service provider ($ISP_B$) 106 via, for example, a T1 line. ISP 106 provides access to Internet 108. As shown, a personal computer (PC) 128 is coupled to Internet 108 via an Internet service provider ($ISP_C$) 126. PC 128 may represent a home computer system of an individual human resource personnel or other authorized personnel. As shown in FIG. 1, a subscriber workstation (WS) 112 is coupled to network server 114. Network server 114 is coupled to Internet service provider ($ISP_A$) 110, which is coupled to Internet 108. As depicted, $ISP_A$ 110 also provides Internet 108 access for intranet 124.

Intranet 124 includes a network server 116 coupled to an internal subscriber workstation 122. Network server 116 is also coupled to a web server 118. Web server 118 includes a processor 117 coupled to a memory subsystem 119. Processor 117 communicates with network server 116 and controls the retrieval and storage of subscriber data from/in database 120, which is located on, for example, a hard disk drive. Preferably, information is maintained in database 120 as indexed sequential access method (ISAM) files that are managed by Byte Designs (of British Columbia) D-ISAM library of C functions. Alternatively, the functions of network server 116 and web server 118 can be incorporated with a single server.

Figure 3:
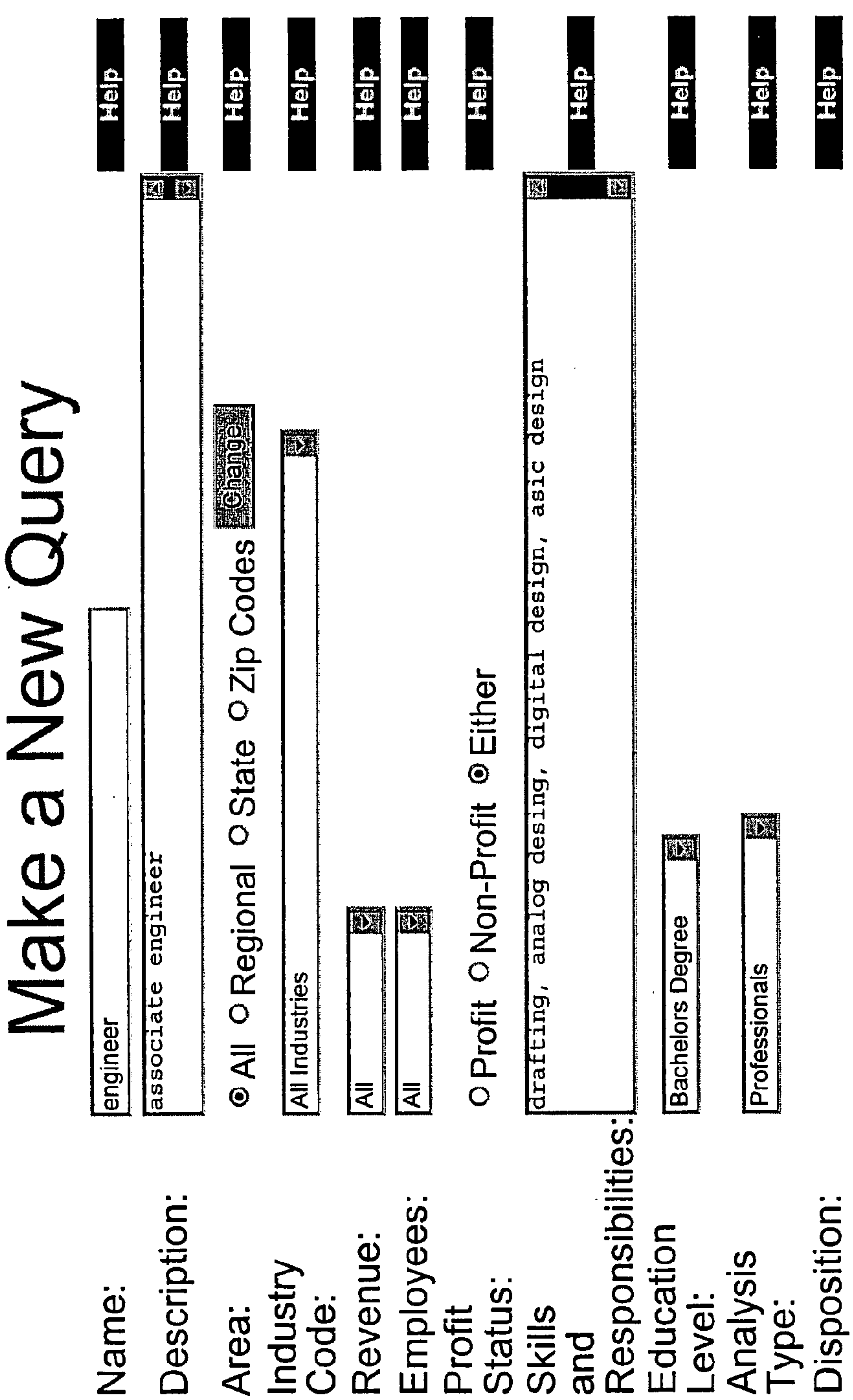
FIG. 3 is a screendisplay of a typical form for providing a new query, according to an embodiment of the present invention.
Figure 4:
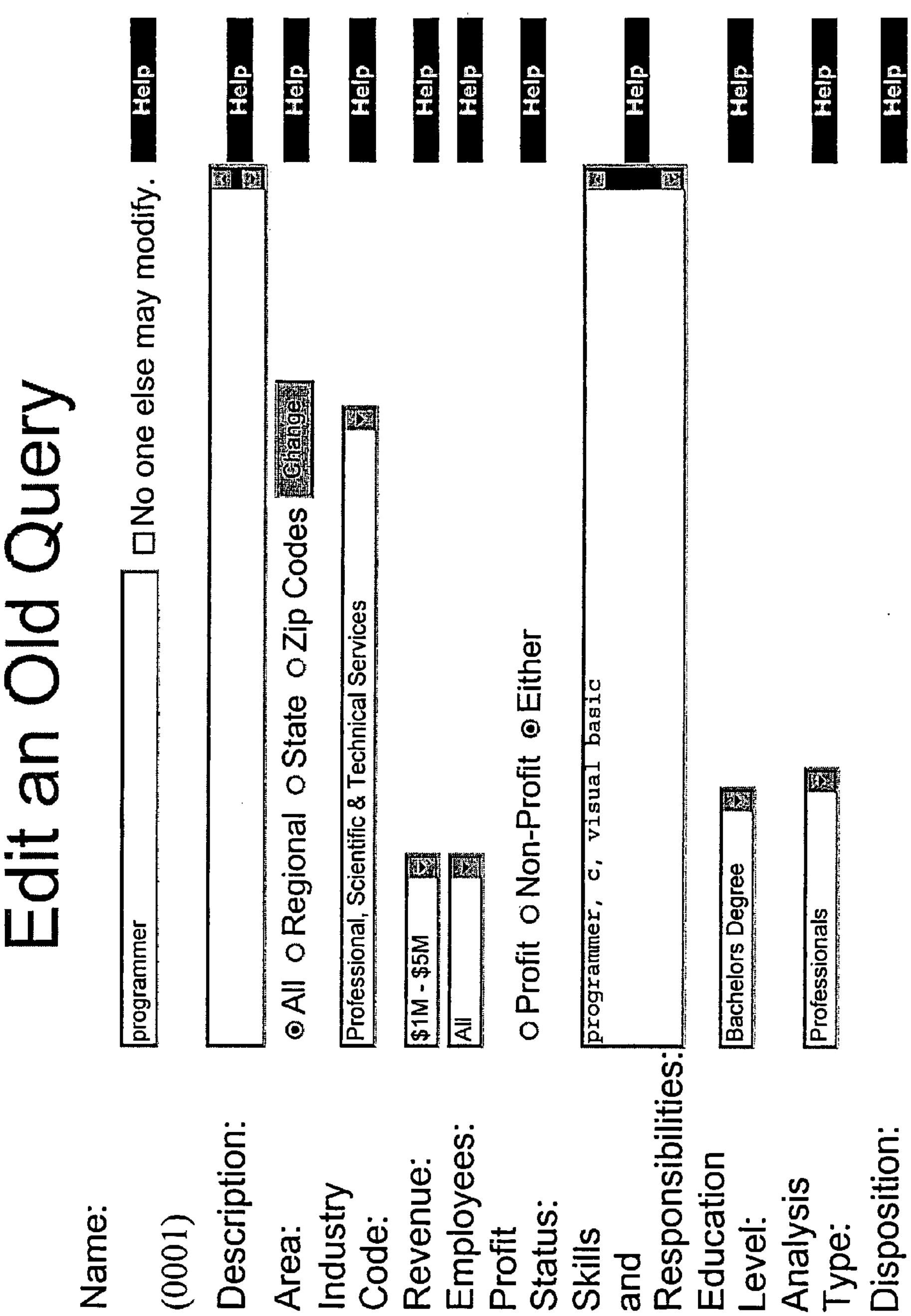
FIG. 4 is a screendisplay of a typical form for editing a stored query, according to an embodiment of the present invention.

A subscriber at WS 102 can transfer/receive information to/from database 120 by accessing web server 118 via network server 104, $ISP_B$ 106, Internet 108, $ISP_A$ 110 and network server 116. Initially, a subscriber at WS 102 accesses database 120 by entering the uniform resource locator (URL) of the survey service via their Internet browser (e.g., Netscape Navigator®, Microsoft Internet Explorer®). Preferably, web server 118 includes a common gateway interface (CGI) program that facilitates communication between web server 118 and a subscriber at workstation 102. As is well known to one of ordinary skill in the art, a CGI program can be written in virtually any programming language (e.g., C, Perl, Java or Visual Basic®). Preferably, the CGI program (which is preferably written in C) causes various hypertext transfer markup language (HTML) forms (i.e., web pages) to be provided to a subscriber. The forms facilitate communication between the web server and the subscriber at, for example, WS 102. Exemplary screendisplays for such forms are shown in FIGS. 3–4. HTML forms are also preferably utilized to provide reports to a specific subscriber. One of ordinary skill in the art will appreciate that reports can be provided in other electronic forms, e.g., via e-mail.

Upon logging into the system, a particular subscriber can provide a particular query (or select a stored query) through a provided form. A typical query includes at least one desired employee attribute. In a preferred embodiment, a query form includes the following categories: name, description, area, industry code, revenue, employees, profit status, skills and responsibilities, education level and analysis type. The function of the categories can be best appreciated by way of example. The 'name' category allows a given subscriber to provide a name for the query. For example, a subscriber interested in data on a computer programmer may utilize the term 'programmer' for the name of the query. If desired, the subscriber can provide a brief description (e.g., 250 words or less) of the query in the 'description' category.

The 'area' category allows a subscriber to limit the query by geographic qualifiers (e.g., all, regional, state or zip code). The 'industry code' category allows a subscriber to focus the query on a given industry (e.g., Agriculture, Forestry, Fishing & Hunting; Mining; Utilities; Construction; Manufacturing—Food, Beverages & Textiles; Manufacturing—Wood, Paper, Chemical & Petrochemical; Manufacturing—Durable Goods; Wholesale Trade; Retail Trade; Retail Trade-Specialty; Information; Finance & Insurance; Real Estate & Rental & Leasing; Professional, Scientific & Technical Services; Management of Companies & Enterprise; Administration & Support, Waste Management & Remediation; Educational Services; Health Care & Social Assistance; Arts, Entertainment & Recreation, etc.). The 'revenue' category allows a subscriber to limit the query to companies of a particular revenue range (e.g., $1 million-$5 million). The profit status category allows a subscriber to discriminate between profit and non-profit companies, if desired. Preferably, company information is provided in each employee record. However, one of ordinary skill in the art will appreciate that company specific information for each subscriber can be separately maintained in database 120, if desired.

The 'employees' category allows a subscriber to focus on the size of the company as gauged by the number of employees (e.g., 250–1000 employees). As a general rule, a subscriber would utilize only one of the 'revenue' and 'employee' categories for a given query (i.e., one of the categories will normally use the 'all' selector). If a subscriber was interested in employee compensation data for a computer programmer, the subscriber might enter, 'programmer, C, Visual Basic' in the 'skills and responsibilities' category of the query form. The 'education level' category preferably allows a subscriber to also base an analysis on the education level of the employee (e.g., any education level, high school, bachelors degree, masters degree, etc.). The 'analysis type' category preferably requires a subscriber to also base a query on an employee type (e.g., Officials & Managers, Professional, Technicians, Sales Office & Clerical, Craft Workers (Skilled), Operatives (Semiskilled), Laborers (unskilled) and Service Workers).

Upon submission of a query, the CGI program causes a report to be compiled from the database in response to the query. The report provides associated employee compensation data for employees that have the at least one desired employee attribute (provided in the 'skills and responsibilities' category). Preferably, both management and non-management reports can be generated upon submission of a query. This type of report is preferably automatically selected when a subscriber chooses what level of employees to analyze. As listed above, the 'analysis type' preferably corresponds to the nine basic equal employment opportunity (EEO) classifications.

Preferably, the report includes the employee compensation data in tabular and graphical format. A typical management graph contains information on both short-term incentives (STI) and long-term incentives (LTI). A typical non-management summary graph includes information on total cash by years-of-experience. This allows a subscriber to determine whether years-of-experience is a factor in salary progression for the type of skills and responsibilities queried. More detailed reports containing information on STI and LTI are preferably automatically produced by years-of-experience and are viewed by selecting associated 'years-of-experience' buttons. One of ordinary skill in the art will appreciate that downloadable subscriber data can be provided for further analysis, if needed.

Utilizing an Internet accessible web server 118 allows a subscriber at WS 102, WS 112, WS 122 and/or PC 128, for example, to access employee data, e.g., employee compensation data, at virtually any time of the day or day of the week. For example, human resources personnel could access web server 118 through their own home PC 128 on a weekend or after work hours.

Figure 2:
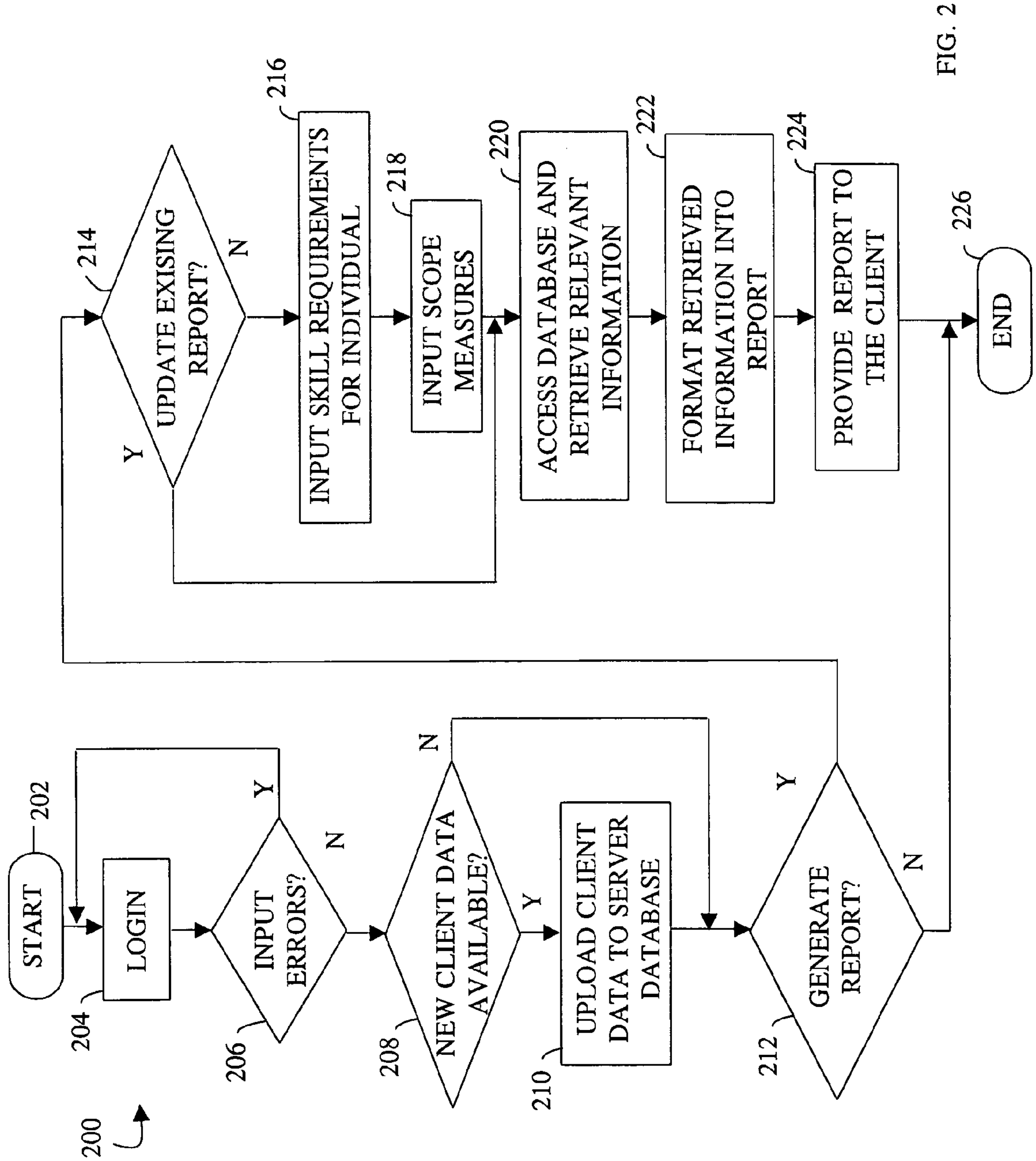
FIG. 2 is a flowchart of a program routine for providing employee data, according to an embodiment of the present invention.

FIG. 2 depicts a flowchart of an employee compensation routine 200, according to an embodiment of the present invention. At step 202, routine 200 is initiated. Next, in step 204, a subscriber logs onto the system. Then, in step 206, routine 200 determines whether the subscriber has properly entered their password and subscriber identification. If so, control transfers from step 206 to step 208. Otherwise, control transfers from step 206 to step 204. In step 208, routine 200 determines whether new subscriber data is available. As previously discussed, preferably, a subscriber provides subscriber data to database 120 on a quarterly basis. If applicable, new subscriber data is uploaded to database 120 in step 210. Otherwise, control transfers from step 208 to step 212. One of ordinary skill in the art will readily appreciate that subscriber data can be uploaded at scheduled times (e.g., after normal work hours).

In step 212, routine 200 determines whether a report is to be generated. If so, control transfers to step 214. Otherwise, routine 200 transfers control to step 226 where routine 200 terminates. In step 214, routine 200 determines whether an existing report is to be updated. If so, control transfers to step 220. Otherwise, control transfers from step 214 to step 216. In step 216, a subscriber inputs the skill requirements for the individual. Next, in step 218, a subscriber enters a number of scope measures. As previously mentioned, a scope measure may be based on whether a company is a profit/non-profit company, in a particular industry, within a certain range of sizes, has a company revenue in a certain range and/or geographic location, among others. Next, in step 220, routine 200 causes database 120 to be accessed and relevant information to be retrieved. Then, in step 222, retrieved information is formatted into a report. Next, in step 224, a report is provided to the subscriber. From step 224, control transfers to step 226 where routine 200 ends.

In summary, the present invention provides automated comparison of employment data of a subscriber to that of the relevant market (as contained in the survey service database and determined by the subscriber), based, in part, on person-based skills. In addition, the compiled report preferably includes a combination of graphical and tabular data that provides a summary of the factors that were utilized to select the employee data.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method that facilitates automated comparison of employee data between a plurality of subscribers, comprising the steps of:

maintaining a database of subscriber data that is provided by a plurality of subscribers, the subscriber data including employee data for a plurality of employees, wherein the employee data is correlated to a plurality of employee attributes, and wherein the plurality of employee attributes includes at least one of an employee skill and an employee responsibility and the plurality of subscribers includes at least two subscribers from non-related companies;

receiving a query from a specific subscriber, the query including at least one desired employee attribute; and compiling a report from the database in response to the query, the report providing associated employee data for employees that have the at least one desired employee attribute.

2. The method of claim 1, wherein the report is electronically provided to the specific subscriber via an HTML form.

3. The method of claim 1, further including the steps of:

associating the query with the specific subscriber;

storing the query; and providing an updated report when the specific subscriber selects the stored query, wherein the specific subscriber is not required to again enter the at least one desired employee attribute associated with the stored query.

4. The method of claim 1, wherein the employee data is employee compensation data and the report provides a comparison between the employee compensation data of the specific subscriber and the employee compensation data of all other subscribers with the at least one desired employee attribute.

5. The method of claim 1, wherein the query includes at least one scope measure.

6. The method of claim 1, wherein the report includes a summary of the at least one desired employee attribute used to compile the report.

7. The method of claim 1, wherein the report includes the employee data in tabular and graphical format.

8. A computer system that facilitates automated comparison of employee data between a plurality of subscribers, comprising:

a processor;

a memory subsystem for storing data and information coupled to the processor; and processor executable code located within the memory subsystem for causing the processor to perform the steps of:

maintaining a database of subscriber data that is provided by a plurality of subscribers, the subscriber data including employee data for a plurality of employees, wherein the employee data is correlated to a plurality of employee attributes, and wherein the plurality of employee attributes includes at least one of an employee skill and an employee responsibility and the plurality of subscribers includes at least two subscribers from non-related companies;

receiving a query from a specific subscriber, the query including at least one desired employee attribute; and compiling a report from the database in response to the query, the report providing associated employee data for employees that have the at least one desired employee attribute.

9. The system of claim 8, wherein the report is electronically provided to the specific subscriber via an HTML form.

10. The system of claim 8, further including the steps of:

associating the query with the specific subscriber;

storing the query; and providing an updated report when the specific subscriber selects the stored query, wherein the specific subscriber is not required to again enter the at least one desired employee attribute associated with the stored query.

11. The system of claim 8, wherein the employee data is employee compensation data and the report provides a comparison between the employee compensation data of the specific subscriber and the employee compensation data of all other subscribers with the at least one desired employee attribute.

12. The system of claim 8, wherein the query includes at least one scope measure.

13. The system of claim 8, wherein the report includes a summary of the at least one desired employee attribute used to compile the report.

14. The system of claim 8, wherein the report includes the employee data in tabular and graphical format.

15. A human resource information system that facilitates automated comparison of employee compensation data between a plurality of subscribers, comprising:

a processor;

a memory subsystem for storing data and information coupled to the processor; and processor executable code located within the memory subsystem for causing the processor to perform the steps of:

maintaining a database of subscriber data that is provided by a plurality of subscribers, the subscriber data including employee compensation data for a plurality of employees, wherein the employee compensation data is correlated to a plurality of employee attributes, and wherein the plurality of employee attributes includes at least one of an employee skill and an employee responsibility and the plurality of subscribers includes at least two subscribers from non-related companies;

receiving a query from a specific subscriber, the query including at least one desired employee attribute and at least one scope measure; and compiling a report from the database in response to the query, the report providing associated employee compensation data for employees that have the at least one desired employee attribute.

16. The system of claim 15, wherein the report is electronically provided to the specific subscriber via an HTML form.

17. The system of claim 15, further including the steps of:

associating the query with the specific subscriber;

storing the query; and providing an updated report when the specific subscriber selects the stored query, wherein the specific subscriber is not required to again enter the at least one desired employee attribute associated with the query.

18. The system of claim 15, wherein the report provides a comparison between the employee compensation data of the specific subscriber and the employee compensation data of all other subscribers with the at least one desired employee attribute.

19. The system of claim 15, wherein the at least one scope measure includes at least one of the following categories: profit, nonprofit, industry, company size, company revenue and geographic location.

20. The system of claim 15, wherein the report includes a summary of the at least one desired employee attribute used to compile the report.

21. The system of claim 15, wherein the report includes the employee compensation data in tabular and graphical format.

* * * * *